Aug. 16, 1966    J. A. SCHOLL    3,266,159
DIAL GAUGE VERNIER CALIPER
Filed March 16, 1964
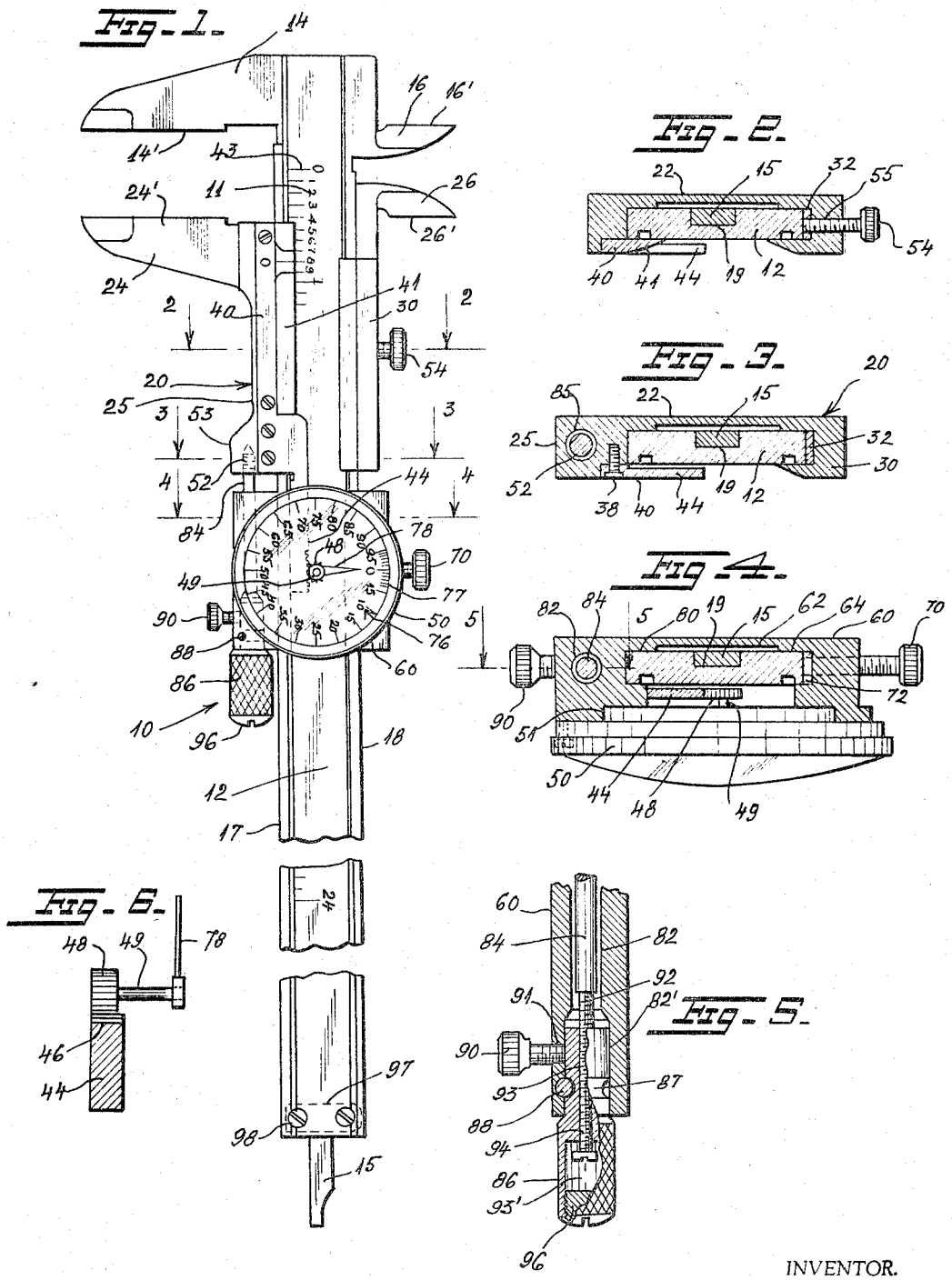
INVENTOR.
Jule A. Scholl
BY
Polachek & Saulsbury
ATTORNEYS.

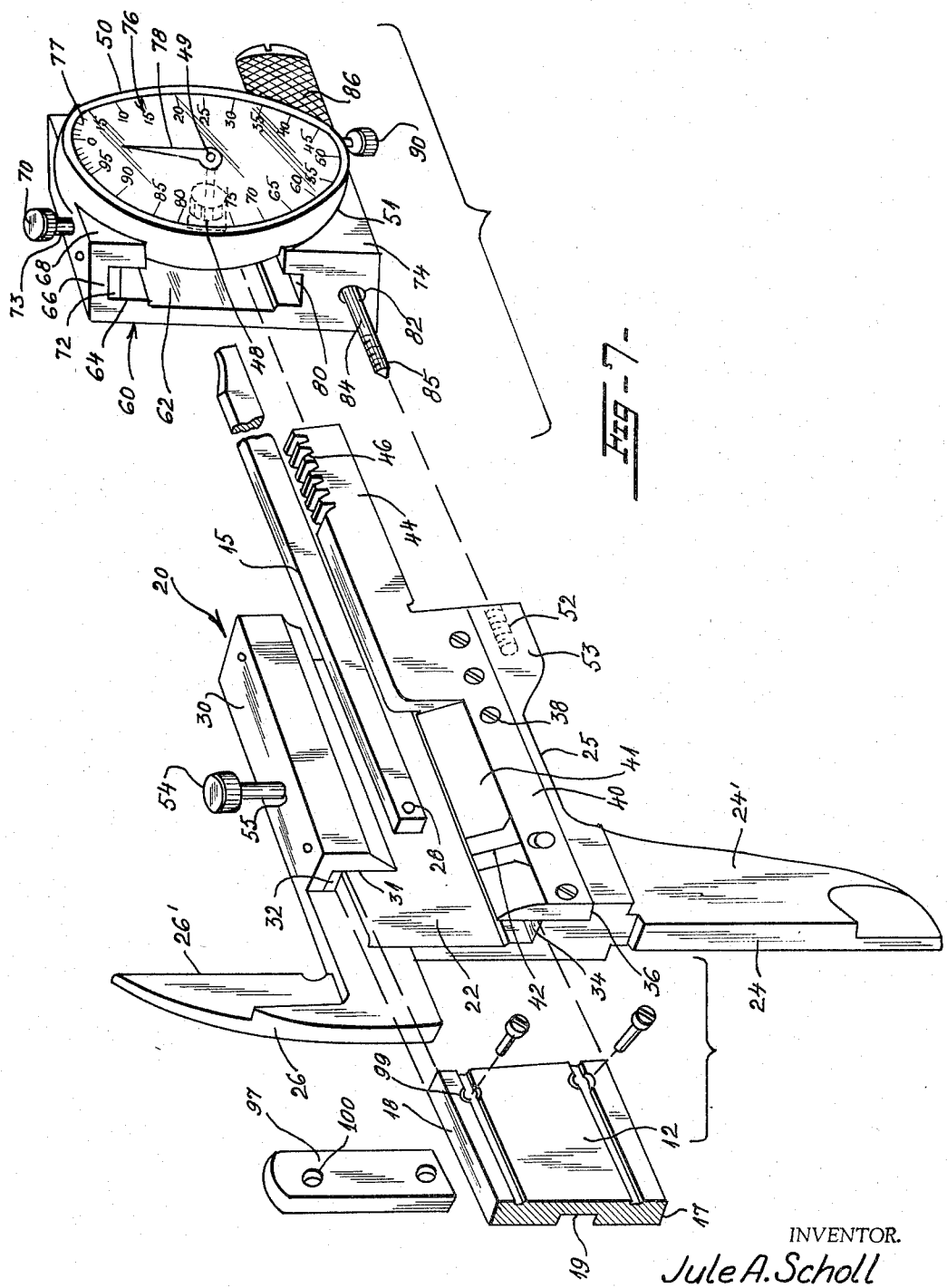

United States Patent Office 3,266,159  
Patented August 16, 1966

3,266,159  
DIAL GAUGE VERNIER CALIPER  
Jule A. Scholl, 170 E. 83rd St., New York, N.Y.  
Filed Mar. 16, 1964, Ser. No. 352,065  
10 Claims. (Cl. 33—147)

This invention relates to the art of vernier calipers and more particularly concerns a vernier caliper having a dial gauge for micrometric measurements.

It has been proposed heretofore to provide a vernier caliper with a micrometric dial scale or gauge. When such a dial gauge is provided it is mounted upon a carriage frame for a movable jaw and moves long a caliper bar or rail with the carriage frame. The gauge has a pinion gear which is meshed with a rack gear extending for substantially the full length of the caliper bar. The pinion gear is connected to the pointer of the dial gauge. When the carriage frame is moved along the bar for its full length, the pointer of the gauge rotates continuously since the pinion is continuously in mesh with the rack gear. This arrangement and construction has precluded use of a micrometric dial gauge in long calipers exceeding approximately four inches in length. This is because excessive wear occurs on both the rack gear and pinion gear due to the continuous drive of the pinion by the rack gear. Furthermore, construction of a rack gear in a length exceeding four inches, with precisely cut teeth throughout, is a very difficult operation, and is very expensive.

Other difficulties are encountered in fabricating a long vernier caliper of conventional construction with a dial scale or gauge, so that for all practical purposes, manufacturers of long vernier calipers have resorted to the use of linear vernier scales. Such scales are difficult to read, result in loss of production time, and are frequently mislead so that costly errors occur.

The present invention overcomes the above and other difficulties and disadvantages by providing a vernier caliper with a direct reading micrometric dial scale or gauge of large diameter, upon a caliper bar of any required length, as much as seventy-two inches or even more. In the caliper according to the present invention, the dial gauge is mounted on its own carriage frame which is connected to a main carriage frame carrying inside and outside measuring jaws of the caliper. The connection between carriage frames is by means of a threaded shaft which can be turned to change the spacing between the carriages. The dial gauge has a pinion gear which is in mesh with a very short rack gear carried by the main carriage frame for the jaws of the caliper. The pinion gear remains stationary at all times while the carrage frames are moved along the caliper bar, regardless of its length. Then, after a rough or approximate setting of the jaws of the caliper, the carriage of the dial gauge is locked to the caliper bar and the threaded shaft is turned to move the main carriage frame and accomplish fine setting of the caliper jaws while the dial gauge indicates the fine micrometric setting of the caliper. The scale of the gauge may have graduations representing 0.001 of an inch or smaller if required.

It is a principal object of the invention to provide a vernier caliper of extended length, having a main carriage frame for caliper jaws riding on a caliper bar and a second carriage frame for a micrometric dial gauge connected to the main carriage frame by an adjustable threaded shaft and riding along the caliper bar with the main carriage frame, the dial gauge having a drive pinion gear in mesh with a short rack gear carried by the main carriage frame so that the drive pinion is normally stationary while the two carriage frames are moved together along the caliper bar, the drive pinion being movable only when the connecting shaft is turned to vary the spacing between the carriage frames, for obtaining a precise reading of the dial gauge.

Another object is to provide a vernier caliper as described, wherein the scale of the dial gauge has a hundred uniform graduations extending 360° circumferentially around the scale, the length of the scale representing 0.10 of an inch so that each scale graduation represents 0.001 of an inch.

A further object is to provide a vernier caliper as described wherein the caliper bar or rail has a length ranging up to seventy-two inches or more.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a plan view of a caliper embodying the invention, parts being broken away.

FIGS. 2, 3 and 4 are enlarged cross-sectional views taken on lines 2—2, 3—3 and 4—4, respectively, of FIG. 1.

FIG. 5 is a fragmentary sectional view taken on line 5—5 of FIG. 4.

FIG. 6 is an enlarged cross-sectional view of a rack gear, and an associated pinion gear and pointer of a dial gauge.

FIG. 7 is an enlarged exploded perspective view of parts of the caliper, portions being broken away.

Referring to the drawings, there is shown the caliper 10 including a long straight caliper bar or rail 12. On the front side of the bar 12 is a uniformly divided scale 11 extending for substantially the full length of the bar. This scale may be as much as seventy-two inches in length or more, or as little as four inches. The bar has a long stationary jaw 14 at one end with read edge 14' for measuring outside dimensions and another shorter stationary jaw 16 at the same end with front edge 16' for measuring inside dimensions. The jaws 14, 16 extend outwardly of opposite flat edges 17, 18 of the bar. On its rear side, the bar has a long centrally located groove 19 which receives a guide bar 15 attached to a main carriage frame 20.

The main carriage frame 20 includes a generally rectangular back plate 22. At its forward end is a jaw 24 extending outwardly of lower edge 25 of the frame with front face 24' for cooperating with jaw 14 in measuring outside dimensions. Another jaw 26 extends upwardly of plate 22. This jaw has a rearwardly located straight edge 26' for measuring inside dimensions in cooperation with jaws 16. The forward end of bar 15 is attached to the front side of plate 22 by a rivet 28.

A channel flange 30 is integrally formed with plate 22 at its upper end. This flange extends forwardly and defines a groove 31 which receives the upper edge 18 of bar 12. A hard bronze strip 32 is inserted and secured inside the groove 31 to ride on the upper edge 18 of bar 12. A ledge 34 is formed near the lower edge of plate 22. This ledge extends forwardly. On this ledge 22 rides the lower edge 17 of bar 12. A rabbet groove 36 is formed below ledge 34 and in this groove is secured by screws 38 a bar 40. The upper edge 41 of the bar is beveled and an "0" index mark 42 is inscribed on this beveled edge near its forward end. When mark 42 is aligned with corresponding "0" index mark 43 on scale 11, the face 14', 24' of jaws 14, 24 are in abutment and faces or edges 16', 26' of jaws 16, 26 are in registration. The tooth or blade of jaw 26 is slightly offset rearwardly so that it can pass behind jaw 16 on bar 12 at the "0" position of the jaws. A rack gear 44 is formed at the rear end of bar 40 by rack gear teeth 46 milled in the upper edge of the end of the bar. These teeth extend longitudinally of bar 40 a distance no greater than three divisions of scale 11. The teeth are engaged with a spur or pinion gear 48 carried by pin shaft 49 extending rearwardly from the dial gauge 50; see FIGS. 1, 4, 6 and 7. A threaded bore 52 is formed in the lower bottom edge portion 53 of the carriage frame 20, at the rear thereof. A thumb screw 54 is threaded in a bore 55 in the upper edge of carriage frame 20 for locking this frame in a stationary position on bar 12.

The caliper has a smaller carriage frame 60. This frame has a generally rectangular rear wall 62. A groove 64 is formed in the forward side of the frame. This channel is defined by an upper flange 66 which extends forwardly and a depending flange 68 to receive the upper edge 18 of bar 12. A hard bronze strip 72 in groove 64 is secured in groove 64. A locking screw 70 is screwed into bore 73 in the upper edge of flange 66 for locking the frame to the bar 12.

Dial gauge 50 has a round disk-like body of large diameter. The gauge is seated in a round recess 51 defined by arcuate cutouts in flange 66 and in the forward wall 74 of the frame 60. The gauge has a scale 76 uniformly divided into one hundred divisions 77 extending circumferentially around the face of the dial. A pointer 78 carried by a pin shaft 49 rotates around the scale. The pin shaft extends rearwardly out of the body of the gauge and carries pinion gear 48 which meshes with teeth 46 of rack gear 44. A groove 80 is formed near the lower edge of the frame 60 to receive the lower edge 17 of bar 12 in a longitudinal free sliding arrangement.

A bore 82 is formed in the frame 60 near its bottom edge. This bore rotatably receives a shaft 84 which extends forwardly out of the bore. The forward end 85 of the shaft 84 is threaded for engaging in the threaded bore 52 of carriage frame 20. Shaft 84 is axially engaged at its rear end in an externally knurled sleeve 86. The sleeve has an internal circumferential groove 87 in which is engaged a pin 88 extending rearwardly from the front side of frame 60. Pin 88 holds the sleeve rotatably in an enlarged rear portion 82' of bore 82. A locking thumb screw 90 extends upwardly from the bottom edge of frame 60 through threaded bore 91 to lock the sleeve 86 and shaft 84 in non-rotatable position in the frame 60. The rear end of shaft 84 terminates in a threaded portion 92 engaged in a threaded bore 93 in sleeve 86 for adjustably positioning the shaft axially of the sleeve. A locking screw 94 is also located in threaded bore 93 to lock the shaft 84 in the sleeve. The rear end of screw 94 terminates in an enlarged bore 93' communicating with bore 93. A closure or cap screw 96 is engaged in the rear end of bore 93'. This screw can be removed to provide access to screw 94.

The caliper will be assembled as indicated in FIGS. 1–7. A stop plate 97 will be secured by screws 98 seated in holes 99 near the end of the bar 12 and in threaded holes 100 in plate 97 after the carriage frames 20 and 60 are mounted on bar 12. Plate 97 will then prevent the carriage frames from being pulled off bar 12.

In operation of the caliper, for making an inside or outside measurement, the carriage frames 20 and 60 will be moved as a unit on bar 12 until the outside measuring jaws 14, 24 or inside measuring jaws 16, 26 are approximately at the desired spacing of the work to be measured. The jaws will be spaced so that the "0" index mark 42 is located at the line on scale 11 which is closest to the precise measurement to be made. The pointer 78 will be located at zero on scale 76 at this time by adjustment of knurled sleeve 86. The thumb screw 70 will then be tightened which will lock the carriage frame 60 to rail 12. The knurled sleeve 86 will then be turned which will rotate shaft 84 in bore 52. The main carriage frame 20 will then either move slightly away from or toward the frame 60. Suppose the scale 11 is divided into tenths of an inch. The total movement of frame 20 will then be less than one-tenth of an inch or less than one division of scale 11. During this movement, gear 48 will rotate as the rack gear moves longitudinally. The pointer 78 will rotate and will indicate in thousandths of an inch the vernier reading of the caliper. This vernier reading added to the indication of scale 11 is the true micrometric measurement made by the caliper.

It will be noted that gear 48 for each measurement moves no more than one division of scale 11, in this instance one-tenth of an inch. The gear 48 rotates only when the carriage frame 60 is locked in a stationary position. Otherwise the frame 60 moves freely on bar 12 along with frame 20. As a result, wear of the gear 48 and rack gear 44 is prevented. The useful life, accuracy and service of the instrument is preserved and lengthened. Since the scale 76 on the dial gauge 50 has a large diameter it provides a very accurate reading. The ratio of scale diameter to diameter of gear 48 can be large for reading accurately thousandths of an inch or even ten thousandths. The application of the dial gauge is possible in any desired length of caliper since the length of the rack gear 44 is independent of the length of the bar 12. The cost of the caliper is reduced since use of a long rack gear is avoided. The caliper is easily assembled or disassembled for replacement of parts, cleaning, etc.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, and a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale.

2. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a short bar secured to said main carriage frame, said short bar having a beveled edge with a zero index line at its front end juxtaposed to a side of the long bar, and a straight linear scale on said side of the long bar aligned with said zero index line on the short bar for indicating linear measurements as the main carriage frame is moved along the long bar.

3. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a short bar secured to said main carriage frame, said short bar having a beveled edge with a zero index line at its front end juxtaposed to a side of the long bar, and a straight linear scale on said side of the long bar aligned with said zero index line on the short bar for indicating linear measurements as the main carriage frame is moved along the long bar, said rack gear being integral with said short bar, whereby said pinion gear is stationary and engaged with the rack gear while both carriage frames move together as a unit along the long bar with the connecting shaft engaged in said bore.

4. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a hollow externally knurled sleeve rotatably carried by the second carriage frame, said connecting bar having its other end adjustably seated in said sleeve, and another locking screw carried by said second carriage frame for engaging said sleeve and holding said connecting shaft non-rotatably on the second frame whereby detachment of the two frames from each other is prevented.

5. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a short bar secured to said main carriage frame, said short bar having a beveled edge with a zero index line at its front end juxtaposed to a side of the long bar, a straight linear scale on said side of the long bar aligned with said zero index line on the short bar for indicating linear measurements as the main carriage frame is moved along the long bar, a hollow externally knurled sleeve rotatably carried by the second carriage frame, said connecting bar having its other end adjustably seated in said sleeve, and another locking screw carried by said second carriage frame for engaging said sleeve and holding said connecting shaft nonrotatably on the second frame whereby detachment of the two frames from each other is prevented.

6. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, and a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, said circular scale having one hundred divisions each representing one one thousandth of an inch, said circular scale representing one-tenth of an inch in its entire circular extent of 360°.

7. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a short bar secured to said main carriage frame, said short bar having a beveled edge with a zero index line at its front end juxtaposed to a side of the long bar, and a straight linear scale on said side of the long bar aligned with said zero index line on the short bar for indicating linear measurements as the main carriage frame is moved along the long bar, said linear scale being divided into equal graduations each one-tenth of an inch in width, said circular scale having one hundred divisions each representing one one thousandth of an inch, said circular scale representing one-tenth of an inch in its entire circular extent of 360°.

8. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a short bar secured to said main carriage frame, said short bar having a beveled edge with a zero index line at its front end juxtaposed to a side of the long bar, and a straight linear scale on said side of the long bar aligned with said zero index line on the short bar for indicating linear measurements as the main carriage frame is moved along the long bar, said straight linear scale being divided into equal divisions, said rack gear having teeth extending longitudinally of the bar a distance not greater than three divisions of the linear scale, so that said rack gear moves past said pinion gear a distance no greater than one of the divisions of said linear scale while said micrometric measurement is being made.

9. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a short bar secured to said main carriage frame, said short bar having a beveled edge with a zero index line at its front end juxtaposed to a side of the long bar, and a straight linear scale on said side of the long bar aligned with said zero index line on the short bar for indicating linear measurements as the main carriage frame is moved along the long bar, said rack gear being integral with said short bar, whereby said pinion gear is stationary and engages with the rack gear while both carriage frames move together as a unit along the long bar with the connecting shaft engaged in said bore, said straight linear scale being divided into equal divisions, said rack gear having teeth extending longitudinally of the bar a distance not greater than three divisions of the linear scale, so that said rack gear moves past said pinion gear a distance no greater than one of the divisions of said linear scale while said micrometric measurement is being made.

10. A vernier caliper, comprising a long caliper bar having at least one fixed jaw at one end, a main carriage frame slidably mounted on said bar, another jaw at one end of said frame disposed parallel to said fixed jaw for cooperating therewith in making a measurement, said frame having a threaded bore at its other end, a short rack gear carried by said frame and extending rearwardly thereof, a second carriage frame slidably mounted on said caliper bar, a dial gauge carried by said second carriage frame, said gauge having a circular scale, a pointer on a pin shaft rotatable around said scale, said pin shaft extending outwardly of said gauge into said second carriage frame, a pinion gear on said pin shaft meshed with said rack gear, a rotatable connecting shaft carried by the second carriage frame and extending forwardly thereof, said connecting shaft terminating in a threaded end engaged in said threaded bore, a locking screw on the second carriage frame engageable on said bar to lock said second carriage frame in a stationary position, whereby said main carriage frame will be moved toward and away from the second carriage frame when said locking screw is locked on said caliper bar while said rack gear moves and rotates said pinion gear to rotate said pointer on said scale for indicating a micrometric measurement on said scale, a short bar secured to said main carriage frame, said short bar having a beveled edge with a zero index line at its front end juxtaposed to a side of the long bar, a straight linear scale on said side of the long bar aligned with said zero index line on the short bar for indicating linear measurements as the main carriage frame is moved along the long bar, a hollow externally knurled sleeve rotatably carried by the second carriage frame, said connecting bar having its other end adjustably seated in said sleeve, and another locking screw carried by said second carriage frame for engaging said sleeve and holding said connecting shaft non-rotatably by the second frame whereby detachment of the two frames from each other is prevented, said straight linear scale being divided into equal divisions, said rack gear having teeth extending longitudinally of the bar a distance not greater than three divisions of the linear scale, so that said rack gear moves past said pinion gear a distance no greater than one of the divisions of said linear scale while said micrometric measurment is being made.

References Cited by the Examiner

UNITED STATES PATENTS

| | | | |
|---|---|---|---|
| 2,030,320 | 2/1936 | Ricci | 33—147 |
| 2,855,684 | 10/1958 | Welstead | 33—143 |
| 2,924,017 | 2/1960 | Sorensen | 33—147 |

LEONARD FORMAN, *Primary Examiner.*